UNITED STATES PATENT OFFICE.

CARL BERGMANN, OF HANOVER, GERMANY, ASSIGNOR TO WILHELM MALLMANN, OF BRUSSELS, BELGIUM.

PROCESS OF OBTAINING VANILLIN.

SPECIFICATION forming part of Letters Patent No. 571,917, dated November 24, 1896.

Application filed June 13, 1896. Serial No. 595,467. (Specimens.) Patented in Belgium July 28, 1893, No. 105,742.

*To all whom it may concern:*

Be it known that I, CARL BERGMANN, of Hanover, in the Empire of Germany, have invented a new and useful Process for the Formation of Artificial Flavoring, commonly known as "Vanillin," (for which I have obtained Belgian Patent No. 105,742, dated July 28, 1893,) of which the following is a full, true, and exact description.

My invention relates to a new and useful process of producing the artificial flavoring commonly known as "vanillin."

The paraoxybenzaldehyde

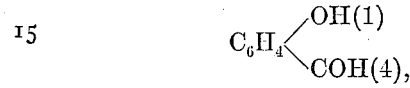

which is formed from carbolic acid, together with ortho-oxybenzaldehyde, (salicyl-aldehyde,) in the well-known manner by means of chloroform and caustic soda, may be used for the manufacture of vanillin, (metamethoxyparaoxybenzaldehyde)

for which purpose it is only necessary to introduce the methoxy group ($O-CH_3$) into the molecule for the hydrogen in the meta position to the COH group of the paraoxybenzaldehyde. This method has not been in use hitherto. On the contrary, the paraoxybenzaldehyde, which in the production of salicylaldehyde (for the manufacture of cumarin) is produced from carbolic acid to the extent of about twelve per cent. of the latter, has been considered as a waste by-product for which there could not be found any use.

In order to introduce the methoxy group into the molecule of the paraoxybenzaldehyde, the latter is treated with concentrated nitric acid by dissolving one part of the paraoxybenzaldehyde in six to seven parts of cold concentrated sulfuric acid, adding to the solution, drop by drop, concentrated nitric acid until the development of gas ceases. The addition of nitric acid is done under careful cooling. The acid mixture is then poured into water, whereupon metanitroparaoxybenzaldehyde is precipitated in yellow needles. The nitro product is precipitated by recrystallization from boiling alcohol. For the reduction of the nitro compound ten parts of the latter are dissolved in one hundred parts of ethyl-alcohol with the addition of fifty parts of water. The reduction is accomplished by means of iron and acetic acid or peroxid of tin and muriatic acid in the calculated quantity of protochlorid of tin dissolved in muriatic acid. In the latter case the liquid must be warmed to about 40° to 50° centigrade. After the reduction has been completed precipitate with ammonia, filter, distil off the alcohol, and dry the thus-obtained meta-amido-paraoxybenzaldehyde under the exclusion of air. Then dissolve the amido body in methyl-alcohol, free from water, or evaporate the residue after distilling off the grain alcohol to dryness and extract it with methyl-alcohol free from water, employing for every ten parts of amido compound one hundred parts of methyl-alcohol. Then introduce nitrous acid into the cooled solution and warm slowly on the water-bath to 50° centigrade and boil, using a return-condenser.

The formation of vanillin takes place according to the following equation:

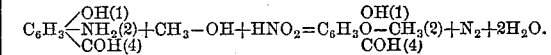

After distilling off the alcohol the formed vanillin is purified in the well-known manner by means of the bisulfite of sodium compound.

What I claim as my invention, and desire to secure by Letters Patent, is—

1. The process for the manufacture of vanillin from paraoxybenzaldehyde, which consists in converting the same into the meta-nitro-meta-amido-methoxyparaoxybenzaldehyde, substantially as described.

2. The process for the manufacture of vanillin from paraoxybenzaldehyde, which consists in changing the latter into the meta-nitro and meta-amido combination, and then transforming the latter into metamethoxyparaoxybenzaldehyde (vanillin) by the action of nitrous acid in alcoholic solution, substantially as described.

In testimony whereof I have signed my name to this specification in the presence of two subscribing witnesses.

C. BERGMANN.

Witnesses:
D. P. HERMANN,
D. EDW. CRANE.